JOHN WALFORD McLEAN
THOMAS HENRY HUGHES
INVENTORS

By Albert Jacobs
Their Attorney 3,464,837
DENTAL MATERIALS
John Walford McLean, London, and Thomas Henry Hughes, Letchworth, England, assignors to National Research Development Corporation, London, England, a corporation of Great Britain
Filed Oct. 1, 1964, Ser. No. 400,771
Claims priority, application Great Britain, Oct. 8, 1963, 39,706/63
Int. Cl. B28b *7/34;* C08h *17/24*
U.S. Cl. 106—35     18 Claims

ABSTRACT OF THE DISCLOSURE

Dental material is provided made up of 40–70% of refractory oxide having a particle size between 200µ and about 10µ and consisting of alumina, titania, or mixtures thereof mixed with feldspar, borosilicate glass or dental porcelain which is fired at 980° C.–1400° C.

---

Figure 1:
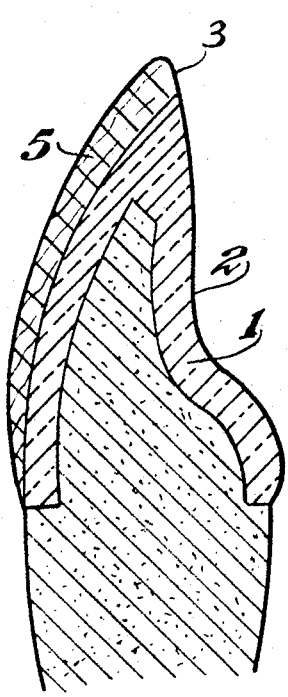

This invention relates to improvements in the methods and materials for use in the construction of artificial teeth and reinforcements therefor, jacket crowns and inlays, bridge pontics and dental enamel veneers. Our co-pending application No. 364,896 discloses a method of constructing denture work and dental restorations which comprises moulding a refractory oxide or mixture of refractory oxides of a high degree of purity into the required form and firing at a temperature and for a time sufficient to ensure sintering and recrystallisation of the oxide without substantial fusion thereof.

Although the exact nature of the sintering and recrystallisation process is not entirely certain, it appears that during firing the following steps occur. First, a welding effect occurs at the points of contact between adjacent oxide particles, giving rise to a lensing effect, as normally occurs in sintering processes. Migration of atoms then takes place from one particles to the other, resulting in a shift in the particle boundaries, or "recrystallisation." During recrystallisation, the shift in grain boundaries results in the formation of a closely interlocking crystalline structure of considerable strength, the improved packing of the particles resulting in shrinkage of the oxide mass. The resulting recrystallised oxide has mechanical properties much superior to those of dental porcelain which are limited by the inferior mechanical characteristics of the glass phase.

In the manufacture of denture work and dental restorations, it is highly desirable that this can be carried out with the equipment commonly found in the ordinary dental workshop. When teeth or preformed cores are formed by the firing of refractory oxides as described in application No. 364,896, the firing temperatures required to ensure recrystallisation will be high: for example in the case of alumina they will normally exceed 1500° C. These temperatures are beyond the range attainable using the furnaces at present commonly used in dental laboratories.

The object of the present invention is to provide dental materials of greater strength than conventional dental porcelain, which can be fired at lower temperatures than those required by the method of application No. 364,896.

According to the invention, a dental material comprises a mixture of a refractory oxide or mixture of refractory oxides and a substance which, at a temperature below that normally necessary to ensure recrystallisation of the oxide, will form a glass phase or matrix which fills the interstices between the oxide particles to give a fired product of superior strength to dental porcelain.

It is believed that fusion of the glass phase with the oxide, or a chemical reaction, occurs at the interface, but the existence or otherwise of any such action is not to be construed as a limitation on the scope of the invention. Suitable glass phase or matrix forming substances are silica, feldspar, low fusion glasses of the borosilicate type or dental porcelain, and a substance is preferably selected having a coefficient of expansion similar to that of the oxide.

According to a further feature of the invention, the refractory oxide may comprise, wholly or in part, recrystallised refractory oxide, in order to reduce shrinkage during the subsequent firing, and act as a reinforcing agent.

The combination of recrystallised oxide and a material such as dental porcelain is particularly advantgeous for the manufacture of crown constructions where great strength and low shrinkage are necessary.

The strength of the fired specimen is also dependent upon the packing ratio of the constituent crystals or powders before firing. It is therefore preferable that the composite mixture has a size distribution which will ensure a minimum void space. In this way, the fired specimen will achieve a high density with a corresponding increase in strength.

The preferred size of the refractory oxide particles is less than 60 microns. It has been found that the strength of the resulting specimen decreases with increasing particle size of the oxide: satisfactory results have been obtained, however, using oxide particle sizes up to 200 microns.

The introduction of the refractory oxide into dental porcelains causes a reduction in light transmission since the refractive indices of the crystal and glass matrix do not match. The reduction in light transmission through an aluminous porcelain containing 40 percent by weight of recrystallised alumina (less than 53 microns) was clinically acceptable, 14 percent light transmission being obtained through a disc 1 mm. thick.

Suitable oxides are recrystallised alumina or calcined alumina. These materials are comparatively unaffected by either the temperature or the surrounding material at up to 1200° C. and act as reinforcing agents and shrinkage controllers. Other crystalline grains of high strength may be used as reinforcing agents, e.g. titanium dioxide, mixed oxides of alumina and silica, etc.

Details are given in the following examples of refractory oxide mixes in which dental porcelain provides the glass phase, which mixes may be fired at lower temperatures than would be required for the oxide alone and at the same time provide increased pyroplasticity of the aluminous-porcelain mixture during firing.

EXAMPLE 1
40% calcined alumina—(less than 20µ)
30% prefused alumina—(less than 150µ)
30% high fusing dental porcelain
Firing temperature 1400° C.

EXAMPLE 2
30% calcined alumina—(less than 20µ)
30% prefused alumina—(less than 150µ)
40% high fusing dental porcelain
Firing temperature 1350–1400° C.

EXAMPLE 3
60% low fusing dental porcelain
40% prefused alumina—(less than 50µ)
Firing temperature 980° C.

EXAMPLE 4
60% medium fusing dental porcelain
40% prefused translucent alumina—(less than 50µ)
Firing temperature 1150° C.

In Examples 1, 2 and 3 calcined alumina represents pure alumina extracted from bauxite by the Bayer process in which the bauxite is digested with caustic soda solution and the alumina is extracted as aluminium trihydrate. This is calcined at 400–600° C. to form Y type alumina and finally at 1200–1350° C. to form an alumina.

The proportions in the above examples are by weight.

All the above mixtures on firing gave a product with a modulus of rupture of 20–30,000 lb./in.$^2$.

The materials of this invention may be used in manufacturing teeth for bridge pontics by pressing an alumina reinforced porcelain in metal tooth moulds to form a reinforcing core. The latter is retained in the gold casting and showed no signs of cracking. The second stage involves coating the labial surface of the alumina with dental porcelain of slightly lower thermal expansion to achieve a suitable tooth-like appearance. The aluminous-porcelain bridge pontics require no gold covering of the incisal edge since the alumina has sufficient strength to resist fractures due to normal stresses occurring during mastication.

Artificial teeth may be constructed by the same method; due to the high strength of the alumina the use of platinum clad retention pins is unnecessary.

The preparation and properties of materials according to the invention are further illustrated by the following examples and with reference to the accompanying drawing which shows a jacket crown in vertical section perpendicular (FIG. 1) and parallel (FIG. 2) to the line of the jaw.

EXAMPLE 5

A series of experiments were carried out in which different materials henceforward referred to as aluminous porcelain were prepared from mixtures of alumina with another component consisting of either one of three dental porcelains or a low fusion glass powder. The thermal expansion of these materials was similar to that of alumina.

In each test, the constituent materials were thoroughly mixed in a rotating mechanical mixer, specimen test bars or rods prepared in a suitable die and the resulting specimens fired.

Details of these preparations are given in Table I.

Various dental uses of the aluminous porcelain produced according to the invention are illustrated in the following examples.

EXAMPLE 7

Jacket crown construction

A commercially available low fusing dental porcelain powder having a thermal expansion of 0.31 percent at 500° C. and a specific surface of 3410 sq. cm./g. was mixed with 40 percent by weight of recrystallised alumina crystals (less than 53 microns) having a thermal expansion of 0.33 percent and a specific surface of 730 sq. cm./g. The dry powder when compacted had a porosity of 42 percent.

This aluminous porcelain was fired at 1100° C. and both air and vacuum firing techniques were employed. The modulus of rupture after firing of the porcelain alone with alumina was 10–12,000 lb./sq. in. while the air fired aluminous porcelain gave figures of 15–16,000 lb./sq. in. On vacuum firing a further strength increase was obtained due to lower porosity of the product and figures in the region of 19–20,000 lb./sq. in. were recorded.

Figure 2:
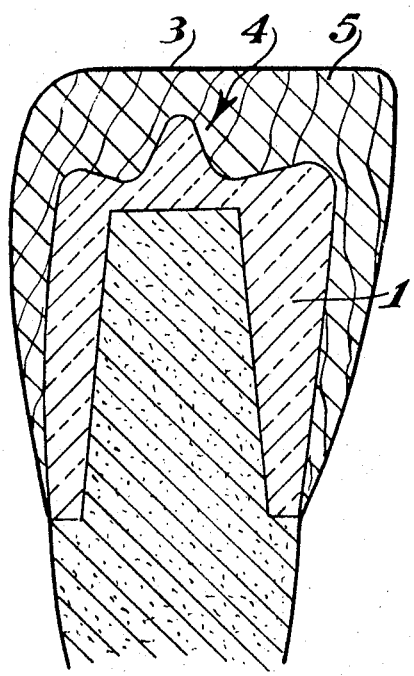

The method of construction of the crowns is illustrated in FIGS. 1 and 2. A core 1 was constructed using the aluminous porcelain powder bonded with distilled water. The entire palatal surface 2 of the crown was made in aluminous porcelain except for the incisal edge 3. The core was shaped as shown in FIG. 2 so as to simulate the dentinal extensions observed in a natural tooth.

The scalloping 4 of the more opaque aluminous porcelain may be varied to give the desired "body" to the crown and in general a slightly lighter colour of core material was used in comparison to the enamel veneer body colour. The core was then fired at 1100° C. for three minutes either in air or under vacuum. The labial enamel veneer 5 was applied using a porcelain of matching thermal expansion and of a standard body and incisal colour which could be fired at 950° C. until the required glaze was obtained.

This type of aluminous porcelain crown is very much more resistant to thermal shock stressing. The extra strength is also markedly enhanced by the lack of tensile

TABLE I

| Mixture No. | Constituents | Percent by weight | Shape of specimen | Firing conditions Temperature, ° C. | Time | Modulus of rupture, lbs./sq. in. |
|---|---|---|---|---|---|---|
| 1 | High fusion feldspatic dental porcelain (as used in the manufacture of artificial teeth) | 100 | Rod | 1200 | 2 min. | 11,000–14,000 |
| 2 | Medium fusion vacuum fired dental porcelain (as used for jacket crown construction) | 100 | Rod | 1130 (vacuum fired) | 3 min. | 9,500–13,000 |
| 3 | Low fusion dental procelain (as used for jacket crowns) | 100 | Rod | 950 | 2 min. | 10,000–12,000 |
| 4 | Medium fusion dental porcelain | 60 | | | | |
| | Recrystallized alumina <53µ | 40 | Rod | 1200 | 3 min. | 23,000–25,000 |
| 5 | Low fusion dental porcelain | 60 | | | | |
| | Recrystallized alumina <53µ | 40 | Rod | 1100 | 2 min. | 17,000–22,000 |
| 6 | Low fusion dental porcelain | 60 | | 1100 | | |
| | Recrystallized alumina<53µ | 40 | Bar (vacuum fired) | | 3 min. | 19,500 |
| 7 | Low fusion glass <75µ | 60 | | | | |
| | Calcined alumina <10µ | 40 | Rod | 1050 | 3 min. | 27,000–33,000 |

EXAMPLE 6

The maximum breaking strengths of laminates of alumina and dental aluminous porcelain were determined by supporting a disc on a circular knife edge and applying a concentrated load at the centre of the opposite face. Discs of recrystallised alumina 2.5 cm. diameter and 1 mm. thick were coated with the porcelain, fired and ground until the aluminous porcelain was 1 mm. thick. The breaking stress of these discs was about 52,000 lb./sq. in. compared with about 8–10,000 lb./sq. in. for the dental porcelain alone and about 82–85,000 lb./sq. in. for recrystallished alumina alone.

strain in the core material which prevents crack propagation under low stress.

Reinforced backings containing recrystallised alumina as described in our co-pending application No. 364,896 may if required be included in the above constructions.

EXAMPLE 8

Construction of a bridge pontic

A core of preformed ivory alumina was made in accordance with specification No. 364,896 and suitable dovetails were formed on the palatal surface for gold retention. A coating of aluminous porcelain was then applied to the labial surface of the alumina core and a standard enamel porcelain veneer was applied so as to complete the incisal edge. The tooth was fired either under vacuum or in air according to the types of porcelain used. Veneers of at least 1 millimeter thickness could be applied with absolute safety and no cracking was observed on the surface.

It is possible with this type of alumina bridge pontic to cast standard gold alloys directly into the dovetail retentions since the alumina is very resistant to thermal shock. The only precaution that should be taken is to bench cool the casting ring before removal of the alumina pontic from the mould.

EXAMPLE 9

Artificial teeth

Teeth were produced by introducing a coating of aluminous porcelain, suitably pigmented if necessary, between an exterior enamel veneer and a prefused alumina core (see application 364,896). In this way the thermal stressing was overcome and coatings of 1 to 2 millimetres thickness could be applied in a single firing.

The aesthetics of the teeth made by this technique were of a high order.

Teeth may also be prepared directly from aluminous porcelain by moulding using the conventional techniques and subsequently glazing by any known means.

The compositions of the invention although described specifically in relation to artificial teeth have other applications in the ceramic field.

What is claimed is:

1. A dental material of superior mechanical strength consisting essentially of an unfired mixture of a reinforcing material of particulate crystalline refractory oxide between a size of up to 200µ, and consisting of alumina, titania, or a mixture thereof, and a matrix forming material consisting of feldspar, borosilicate glass or dental porcelain, the mixture containing between 40% and 70% by weight of refractory oxide, said matrix-forming material having a coefficient of expansion in the same range as said refractory oxide.

2. A material as claimed in claim 1, wherein the refractory oxide comprises, at least in part, calcined alumina.

3. A material as claimed in claim 1, wherein the refractory oxide comprises, at least in part, recrystallized or prefused refractory oxide.

4. A material as claimed in claim 3, wherein the oxide is recrystallized or prefused alumina.

5. A material as claimed in claim 4, wherein the size of the oxide particles is less than 60 microns but not less than about 10 microns.

6. A material as claimed in claim 1, which contains approximately 40% of refractory oxide.

7. Denture work and dental restorations consisting of an element formed by firing a formed unfired mixture of a reinforcing material of particulate crystalline refractory oxide between a size of up to 200µ, consisting of alumina, titania, or a mixture thereof, and a matrix forming material consisting of feldspar, borosilicate glass or dental porcelain, the mixture containing between 40% and 70% by weight of refractory oxide and between 60 and 30% of said matrix-forming material, said matrix-forming material having a coefficient of expansion in the same range as said refractory oxide, the firing temperature being between 980° C. and 1400° C. and sufficient to fuse the matrix forming material without substantially affecting the reinforcing material.

8. The denture work and dental restorations according to claim 7, wherein a dental veneer is fired onto at least part of the surface of the fired element.

9. The denture work and dental restorations according to claim 7, wherein the mixture comprising the fired element is fired onto a recrystallized oxide core.

10. The denture work and dental restorations according to claim 7, wherein said refractory oxide consists, at least in part, of calcined alumina.

11. The denture work and dental restorations according to claim 7, wherein said refractory oxide consists, at least in part, of a recrystallized or prefused refractory oxide.

12. The denture work and dental restorations according to claim 7, wherein said refractory oxide is recrystallized or prefused alumina.

13. The denture work and dental restorations according to claim 12, wherein the size of the oxide particles is between 10 and 60 microns.

14. The denture work and dental restorations according to claim 7, wherein said refractory oxide is present in an amount of about 40%.

15. Denture work and dental restorations including an element formed from a mixture of about 40% calcined alumina particles of size less than 20 microns, about 30% prefused alumina particles of size less than 150 microns, about 30% high fusing dental porcelain, and fired at about 1400° C.

16. Denture work and dental restorations including an element formed from a mixture of about 30% calcined alumina particles of size less than 20 microns, about 30% prefused alumina of size less than 150 microns, and about 40% high fusing dental porcelain, and fired at 1350–1400° C.

17. Denture work and dental restorations including an element formed from about 60% low fusing dental porcelain and about 40% prefused alumina particles of size less than 50 microns, and fired at about 1000° C.

18. Denture work and dental restorations including an element formed from about 60% medium fusing dental porcelain and about 40% prefused translucent alumina particles of size less than 50 microns, and fired at about 1150° C.

References Cited

UNITED STATES PATENTS

| 2,334,319 | 11/1943 | Erdle | 106—35 |
| 2,443,318 | 6/1948 | Lee et al. | 106—35 |
| 2,897,595 | 8/1959 | Lee | 106—35 |
| 2,980,998 | 4/1961 | Coleman et al. | 106—35 |
| 3,069,773 | 12/1962 | Saffir | 106—35 |

JULIUS FROME, Primary Examiner

JOAN B. EVANS, Assistant Examiner

U.S. Cl. X.R.

106—38.3, 38.9; 32—15, 2, 8

PO-1050
(5/69)

UNITED STATES PATENT OFFICE
CERTIFICATE OF CORRECTION

Patent No. 3,464,837          Dated September 2, 1969

Inventor(s) JOHN WALFORD McLEAN ET AL

It is certified that error appears in the above-identified patent and that said Letters Patent are hereby corrected as shown below:

In the heading of the patent "Claims priority, application Great Britain, Oct. 8, 1963, 39,706/63" should read:

--Claims priority, application Great Britain, Oct. 8, 1963, 39,709/63-- and the patent should read with this change incorporated therein.

SIGNED AND
SEALED
FEB 17 1970

(SEAL)
Attest:

Edward M. Fletcher, Jr.
Attesting Officer

WILLIAM E. SCHUYLER, JR.
Commissioner of Patents